(12) United States Patent
Lin et al.

(10) Patent No.: US 10,933,690 B2
(45) Date of Patent: Mar. 2, 2021

(54) SINGLE-POINT REINFORCING STRUCTURE FOR SPOKE OF BICYCLE RIM

(71) Applicant: XIAMEN HONGJI WEIYE INDUSTRIAL CO., LTD, Xiamen (CN)

(72) Inventors: Renbao Lin, Xiamen (CN); Kun Wang, Xiamen (CN); Feihu Wang, Xiamen (CN)

(73) Assignee: XIAMEN HONGJI WEIYE INDUSTRIAL CO., LTD, Xiamen (CN)

( * ) Notice: Subject to any disclaimer, the term of this patent is extended or adjusted under 35 U.S.C. 154(b) by 375 days.

(21) Appl. No.: 16/028,433

(22) Filed: Jul. 6, 2018

(65) Prior Publication Data

US 2019/0184738 A1     Jun. 20, 2019

(30) Foreign Application Priority Data

Dec. 14, 2017   (CN) .......................... 201711341649.X

(51) Int. Cl.
| | |
|---|---|
| *B60B 21/06* | (2006.01) |
| *B60B 21/02* | (2006.01) |
| *B60B 1/00* | (2006.01) |

(52) U.S. Cl.
CPC ............ *B60B 21/062* (2013.01); *B60B 1/003* (2013.01); *B60B 21/025* (2013.01); *B60B 21/064* (2013.01); *B60B 2900/111* (2013.01); *B60B 2900/115* (2013.01); *B60B 2900/311* (2013.01); *B60B 2900/3312* (2013.01)

(58) Field of Classification Search
CPC ....... B60B 21/025; B60B 21/04; B60B 21/06; B60B 21/062; B60B 21/00; B60B 2900/311; B60B 1/003; B60B 1/04; B60B 1/041; B60B 1/043
See application file for complete search history.

(56) References Cited

U.S. PATENT DOCUMENTS

| | | | | | |
|---|---|---|---|---|---|
| 521,385 | A | * | 6/1894 | Mosley | ................... B60B 37/10 301/95.101 |
| 5,249,846 | A | * | 10/1993 | Martin | ...................... B60B 5/02 301/64.705 |
| 5,499,864 | A | * | 3/1996 | Klein | .................... B60B 21/062 301/58 |
| 6,402,256 | B1 | * | 6/2002 | Mercat | ................... B60B 1/041 301/58 |

(Continued)

*Primary Examiner* — Jason R Bellinger
(74) *Attorney, Agent, or Firm* — Bayramoglu Law Offices LLC

(57) ABSTRACT

The present invention provides a single-point reinforcing structure for spoke of bicycle rim which includes a left side wall and a right side wall continuously extending along a circumferential direction of the bicycle rim. The left side wall and right side wall are formed at the left side and the right side of the bicycle rim respectively and are symmetrical to each other. A surface of the left side wall and a surface of the right side wall opposite to each other are connected through a connecting wall. The upper ends of the left side wall and the right side wall extend upward toward a direction close to a symmetry axis and are connected. The left side wall, the right side wall, and the connecting wall are surrounded to form an upper cavity of the bicycle rim. A plurality of connecting holes are arranged on the upper cavity.

13 Claims, 7 Drawing Sheets

(56) References Cited

U.S. PATENT DOCUMENTS

| | | | | |
|---|---|---|---|---|
| 6,425,641 B1* | 7/2002 | Herting | ............... | B60B 1/003 |
| | | | | 301/58 |
| 7,063,392 B2* | 6/2006 | Chen | ............... | B60B 1/041 |
| | | | | 301/58 |
| 8,066,336 B2* | 11/2011 | Passarotto | ............... | B60B 1/0215 |
| | | | | 301/58 |
| 9,186,718 B2* | 11/2015 | Alexandre | ............... | B60B 21/025 |
| 9,493,032 B2* | 11/2016 | Alexandre | ............... | B60B 21/025 |
| 2007/0200422 A1* | 8/2007 | Davis | ............... | B60B 21/025 |
| | | | | 301/95.106 |
| 2008/0296961 A1* | 12/2008 | Dal Pra' | ............... | B60B 21/04 |
| | | | | 301/95.103 |
| 2010/0090519 A1* | 4/2010 | Lin | ............... | B60B 21/04 |
| | | | | 301/58 |
| 2012/0153709 A1* | 6/2012 | Walthert | ............... | B60B 5/02 |
| | | | | 301/95.102 |
| 2012/0324730 A1* | 12/2012 | Lin | ............... | B60B 21/025 |
| | | | | 29/894.33 |
| 2018/0086136 A1* | 3/2018 | Chen | ............... | B60B 1/003 |
| 2018/0201059 A1* | 7/2018 | Hall | ............... | B60B 1/041 |

* cited by examiner

SINGLE-POINT REINFORCING STRUCTURE FOR SPOKE OF BICYCLE RIM

CROSS REFERENCE TO RELATED APPLICATIONS

This application is based upon and claims priority to Chinese Patent Application No. 201711341649.X, filed on Dec. 14, 2017, the entire content of which is incorporated herein by reference.

TECHNICAL FIELD

The present invention relates to the field of bicycles, in particular to a bicycle rim.

BACKGROUND

While Bicycles are normal for people, each process in the field of bicycle manufacturing is very sophisticated, because the quality of each component directly affects the usage of consumers, and the use of unqualified components may be hazardous.

It is well known that a bicycle rim plays a role just like a human's leg. In addition to power, the parts to execute the power are the key elements. Therefore, it is of great importance to choose a bicycle rim with good quality, especially the rear rim in the rear part of a bicycle. When people are travelling, they often carry some heavy things on the bicycle or one or more person on the rear seat of the bicycle, so the pressure resistance of the rear rim of the bicycle body needs to be greatly improved to be able to withstand the high pressure during travel.

A traditional bicycle rim uses a large amount of reinforcing mechanisms in order to increase the load-bearing capacity. However, the use of these mechanisms greatly increases the weight of the bicycle rim, and the structure of the bicycle rim also becomes very complicated. Although the load-bearing capacity can be improved to some extent by doing so, the consequent weight increase and fragile structure are not worth the effort.

SUMMARY

The main technical problem to be solved by the present invention is to provide a single-point reinforcing structure for spoke of bicycle rim, which can ensure the strength and performance of the product while having a lighter weight.

In order to solve the above-mentioned technical problem, the present invention provides a single-point reinforcing structure for spoke of bicycle rim. A left side wall and a right side wall continuously extending along a circumferential direction of the bicycle rim are formed at the left side and the right side of the bicycle rim respectively, and the left side wall and the right side wall are symmetrical to each other. A surface of the left side wall and a surface of the right side wall opposite to each other are connected through a connecting wall. The upper ends of the left side wall and the right side wall extend upward toward a direction close to a symmetry axis and are connected. The left side wall, the right side wall, and the connecting wall are surrounded to form an upper cavity of the bicycle rim. A plurality of connecting holes for connecting the spokes are arranged along a circumferential direction of the bicycle rim on an end surface of the upper cavity at intervals.

The thickness of inner walls of the left side wall and the right side wall at the connecting holes is greater than the thickness of the inner wall between two connecting holes, so that spoke reinforcing regions extending toward two sides from the connecting holes and taking the connecting holes as symmetrical centers are formed on the inner walls of the left side wall and the right side wall.

In a preferred embodiment, lower ends of the left side wall and the right side wall extend downward for a certain distance and then extend toward each other, such that a lower cavity with an opening is formed by the lower ends of the left side wall and the right side wall and the connecting wall. The opening of the lower cavity is continuously distributed along an axial direction of the bicycle rim.

In a preferred embodiment, the reinforcing regions extend to an inner wall of the lower cavity.

In a preferred embodiment, each of the reinforcing regions has a structure with a width gradually reduced from an end far away from the connecting hole to an end close to the connecting hole.

In a preferred embodiment, each of the reinforcing region has a structure with a width gradually increased from an end far away from the connecting hole to an end close to the connecting hole.

In a preferred embodiment, each of the reinforcing region has a width unchanged from an end far away from the connecting hole to an end close to the connecting hole.

In a preferred embodiment, the number of the reinforcing regions is equal to the number of the connecting holes and the reinforcing regions and the connecting holes are in one-to-one correspondence, or the number of the reinforcing regions is less than the number of connecting holes.

In a preferred embodiment, the wall thickness of each of the reinforcing regions has the same value at every point.

In a preferred embodiment, the wall thickness of each of the reinforcing regions at a peripheral portion of each connecting hole is greater the thickness of other portions.

Compared with the prior art, the present invention has the following advantages.

1. According to the single-point reinforcing structure for spoke of bicycle rim provided by the invention, only the wall thickness of the inner wall of the bicycle rim close to the connecting holes of spokes is relatively larger, the wall thickness of other positions is smaller. By doing so, the performance and strength of the product can be ensured while the weight is lighter, and the weight is 10-30% lighter than that of the traditional bicycle rim.

2. According to the single-point reinforcing structure for spoke of bicycle rim provided by the present invention, the product designed according to the structure requires less materials and has lower material cost.

3. According to the single-point reinforcing structure for spoke of bicycle rim provided by the present invention, automatic or semi-automatic operation of product production can be realized, so the quality of the products is stable, and the operation is more efficient.

4. According to the single-point reinforcing structure for spoke of bicycle rim provided by the present invention, the products designed by arranging materials according to the structure satisfy the force condition more, when the rim products are assembled into wheel group, thereby well achieving the goal of optimizing the product design, and making the products more competitive in the market.

DETAILED DESCRIPTION

Figure 1:
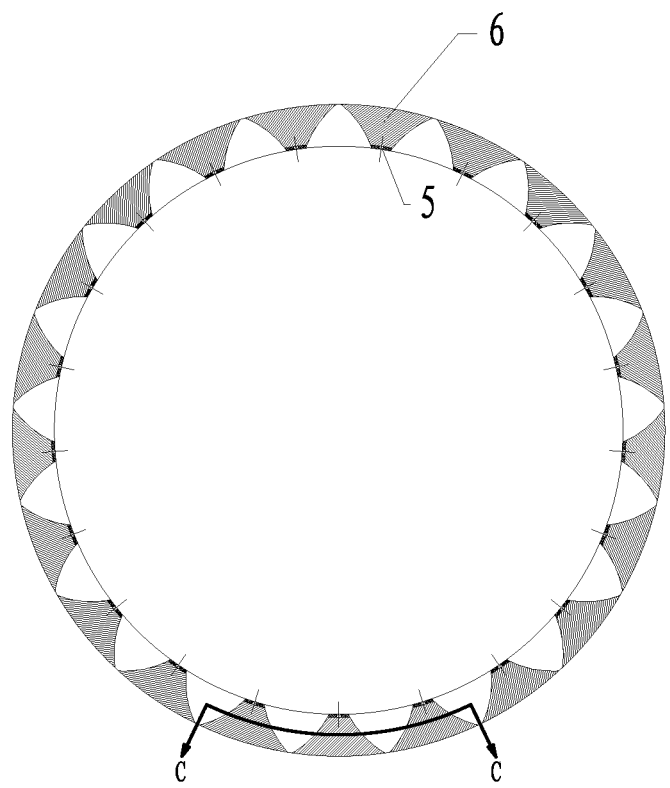
FIG. 1 is a section view of a bicycle rim according to a first preferred embodiment of the present invention.
Figure 2:
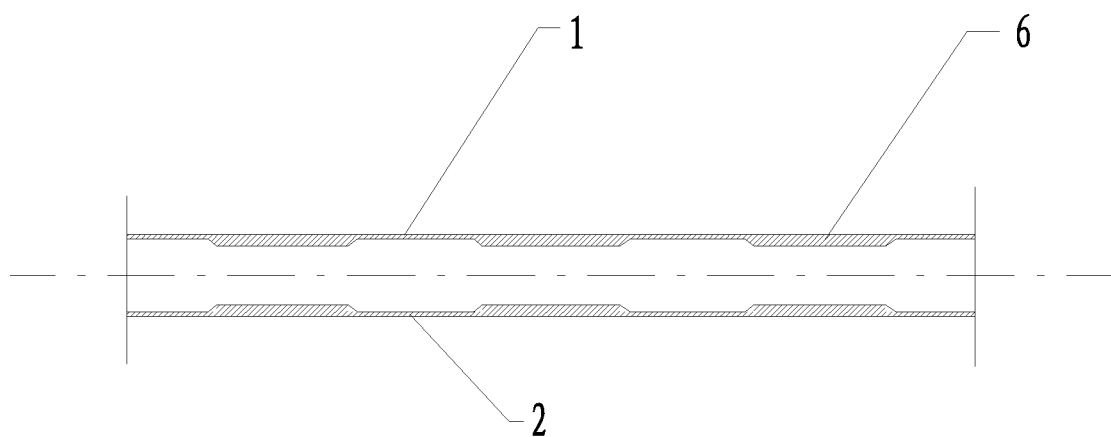
FIG. 2 is a section view of FIG. 1 along C-C direction.
Figure 3:
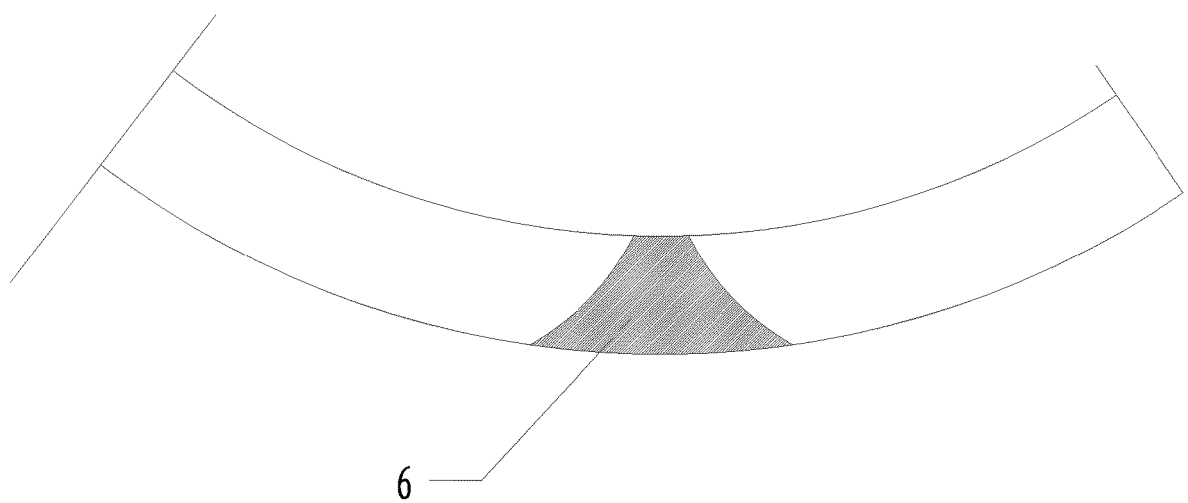
FIG. 3 is an enlarged view of a reinforcing region of the bicycle rim according to the first preferred embodiment of the present invention.
Figure 4:
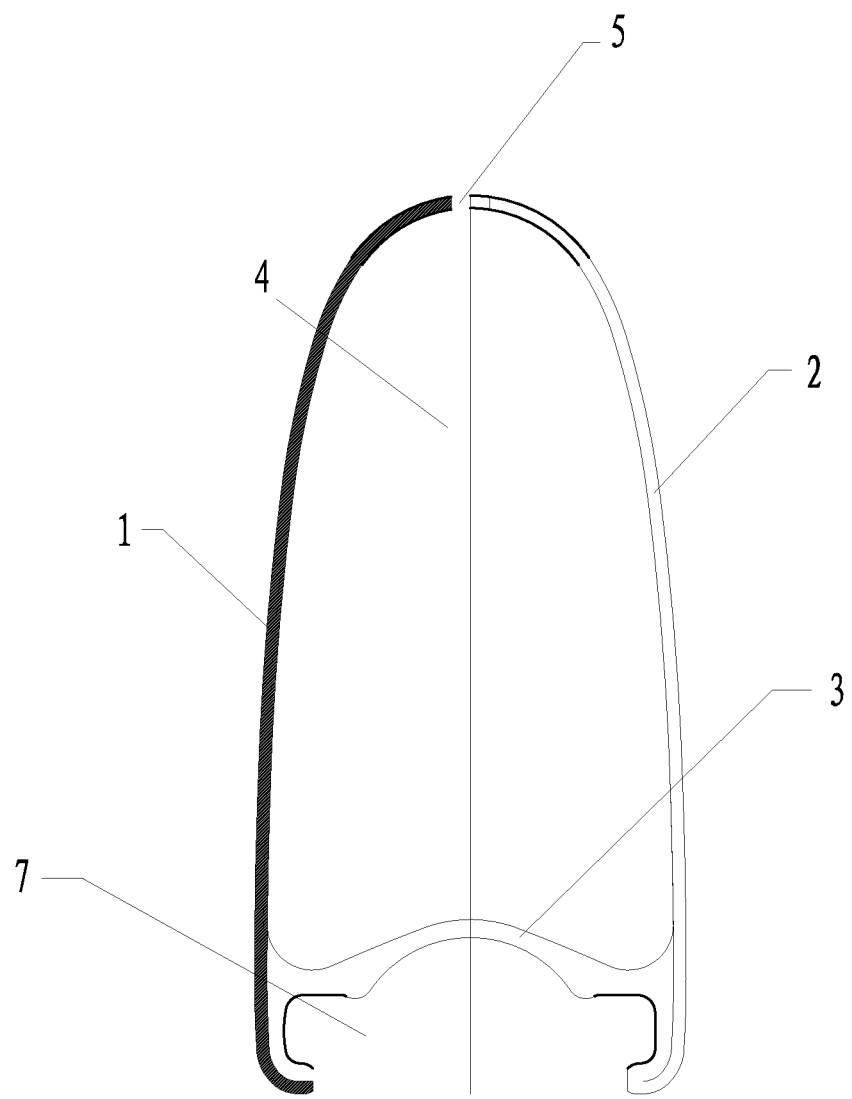
FIG. 4 is a schematic view showing the cross section of the bicycle rim according to the first preferred embodiment of the present invention.

The present invention is further explained below with reference to the drawings and embodiments.

Embodiment 1

A single-point reinforcing structure for spoke of bicycle rim is shown in FIGS. 1-4. A left side wall 1 and a right side wall 2 continuously extending along a circumferential direction of the bicycle rim are formed at the left side and the right side of the bicycle rim respectively, and the left side wall 1 and the right side wall 2 are symmetrical to each other. A surface of the left side wall 1 and a surface of the right side wall 2 opposite to each other are connected through connecting wall 3.

Upper ends of left side wall 1 and right side wall 2 extend upward toward a direction close to a symmetry axis and are connected. The left side wall 1, the right side wall 2, and the connecting wall 3 are surrounded to form an upper cavity 4 of the bicycle rim. A plurality of connecting holes 5 for connecting the spokes are arranged along a circumferential direction of the bicycle rim on an end surface of the upper cavity 4 at intervals.

The thickness of inner walls of the left side wall 1 and the right side wall 2 at the connecting holes 5 is greater than the thickness of the inner wall between two connecting holes 5, so that spoke reinforcing regions 6 extending toward two sides from the connecting holes and taking the connecting holes as symmetrical centers are formed on the inner walls of the left side wall 1 and the right side wall 2.

According to the above-mentioned single-point reinforcing structure for spoke of bicycle rim, only the wall thickness of the inner wall of the bicycle rim close to the connecting holes of spokes is relatively larger, and the wall thickness of other positions is smaller. By doing so, the performance and strength of the product can be ensured while the weight is lighter. The weight of the structure according to the present embodiment may be 10-30% lighter than that of the traditional bicycle rim having the same thickness at every point of the bicycle rim. Moreover, because the thickness of the inner wall of the overall bicycle rim is smaller, the products designed according to the structure need less material and have lower material cost.

The structure in this embodiment can be produced in fully automatic or semi-automatic manner. Since the product can be produced in fully automation or semi-automation, the product quality is stable, and the operation is more efficient. The production efficiency and yield will not be adversely affected due to the addition of the reinforcing structure.

Moreover, since the positions where the bicycle rim is connected to the spokes are subjected to largest pressure during the rolling process of the bicycle rim, the products designed by arranging materials according to the characteristics of the above-mentioned single-point reinforcing structure for spoke of bicycle rim satisfy the force condition more, when the rim products are assembled into wheel group, thereby well achieving the goal of optimizing the product design, and making the products more competitive in the market.

Additionally, lower ends of left side wall 1 and right side wall 2 extend downward for a certain distance and then extend toward each other, so lower cavity 7 with an opening is formed by the lower ends of left side wall 1 and right side wall 2 and connecting wall 3. The opening of lower cavity 7 is continuously distributed along an axial direction of the bicycle rim. Lower cavity 7 is used for mounting a tire.

Reinforcing regions 6 extend to the inner wall of lower cavity 7. Namely, the portions of left side wall 1 and right side wall 2 of the bicycle rim in the reinforcing regions 6 have increased thickness. In this way, the production process is more convenient, and at the same time, the area of reinforcing regions 6 is increased, and the load-bearing performance of the bicycle rim is better.

In this embodiment, reinforcing regions 6 are trapezoid-shaped. Specifically, each of reinforcing region 6 has a structure with a width gradually reduced from an end far away from connecting holes 5 to an end close to connecting holes 5. Moreover, the wall thickness of each of the reinforcing regions 6 has the same value at every point.

Finally, in this embodiment, the number of reinforcing regions 6 is equal to the number of connection holes 5, and reinforcing regions 6 and connection holes 5 are in a one-to-one correspondence. Namely, each of connecting holes 5 is correspondingly provided with a reinforcing region 6. In practical application, the number of reinforcing regions 6 may be less than the number of connecting holes 5, so that some of connecting holes 5 are provided with reinforcing regions 6. In this way, although the load-bearing capacity of the bicycle rim is reduced a little, the weight of the bicycle rim can be greatly reduced. The structure can be adapted to and applied in some products that pursue extreme lightweight.

Embodiment 2

Figure 5:
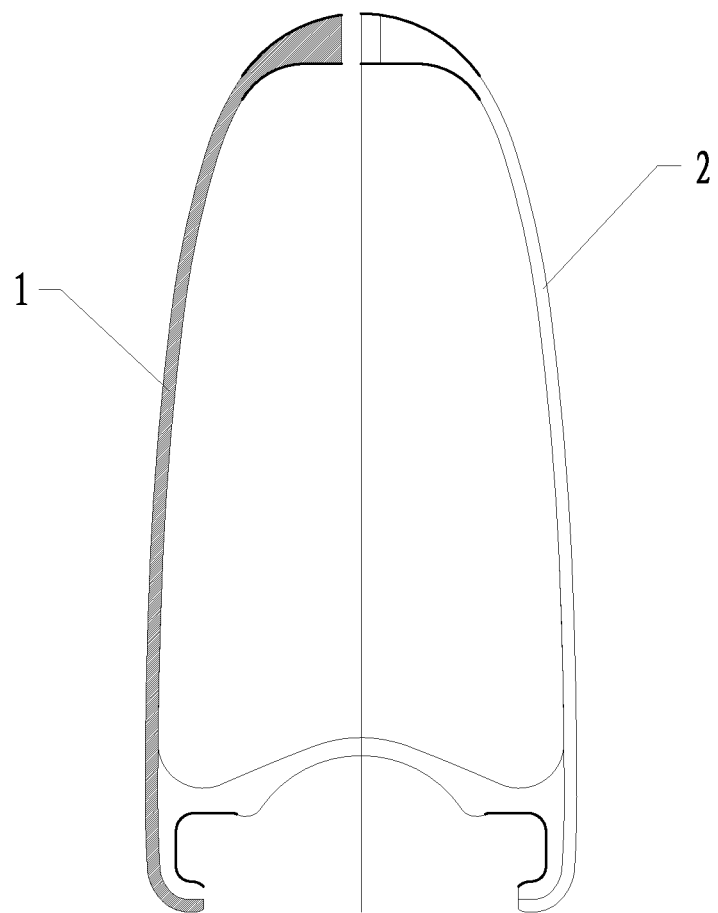
FIG. 5 is a schematic view showing the cross section of the bicycle rim according to a second preferred embodiment of the present invention.

Referring to FIG. 5, the difference between this embodiment and embodiment 1 is that the wall thickness of reinforcing region 6 at the peripheral portions of connecting hole 5 is greater than the thickness of other portions. As a result, the wall thickness of the peripheral portion of connecting hole 5 is further increased, so the load-bearing performance is even better. Other parts are the same as embodiment 1, so they are not repeated here again.

Embodiment 3

Figure 6:
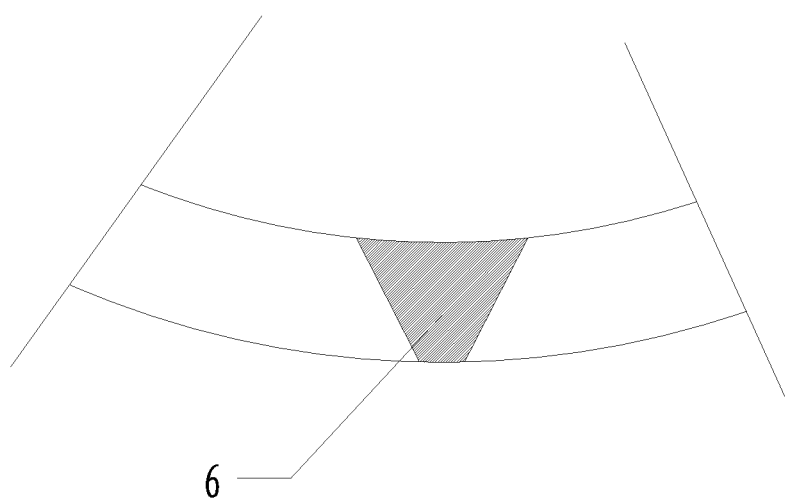
FIG. 6 is an enlarged view of a reinforcing region of the bicycle rim according to a third preferred embodiment of the present invention.

Referring to FIG. 6, the difference between this embodiment and embodiment 1 is that each of the reinforcing region 6 has a structure with a width gradually increased from an end far away from connecting hole 5 to an end close to connection hole 5, so as to form an inverted trapezoid-shaped reinforcing region. Other parts are the same as embodiment 1, so they are not repeated here again.

Embodiment 4

Figure 7:
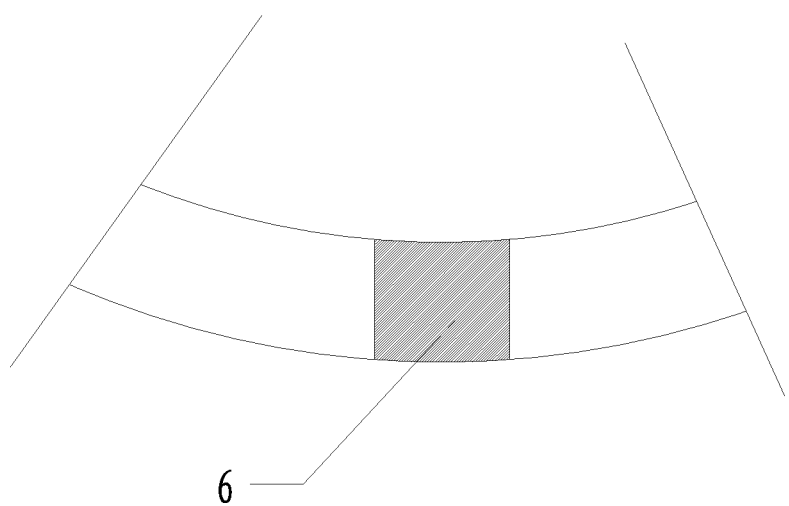
FIG. 7 is an enlarged view of a reinforcing region of the bicycle rim according to a fourth preferred embodiment of the present invention.

Referring to FIG. 7, the difference between this embodiment and embodiment 1 is that each of the reinforcing regions 6 has a width unchanged from an end far away from the connecting hole to an end close to the connecting hole, so as to form a rectangular-shaped reinforcing region. Other parts are the same as embodiment 1, so they are not repeated here again.

The above description merely shows preferred embodiments of the present invention, but the scope of the present invention is not limited thereto. Any change or substitution that can be easily derived by those skilled in the art without departing from the scope defined by the technical solution of the present invention should be considered as falling within the scope of the present invention. Therefore, the scope of the present invention is the scope defined by the appended claims.

What is claimed is:

1. A single-point reinforcing structure for spokes of a bicycle rim, comprising:
    a left side wall and a right side wall continuously extend along a circumferential direction of the bicycle rim, wherein the left side wall and the right side wall are formed at a left side and a right side of the bicycle rim respectively and are symmetrical to each other; and wherein the left side wall includes a first end and a second end positioned opposite to the first end, and wherein the right side wall includes a first end and a second end positioned opposite to the first end;
    wherein the left side wall includes a first surface between the first and second ends of the left side wall and the right side wall includes a second surface between the first and second ends of the right side wall; wherein the first and the second surfaces are positioned opposite to each other and are connected through a connecting wall;
    a first end of the left side wall and a first end of the right side wall extend perpendicularly to a symmetry axis of the bicycle rim along a circumferential direction and are connected;
    a first cavity formed between the first end of the left side wall, the first end of the right side wall, and positioned above the connecting wall;
    a plurality of connecting holes for connecting the spokes are positioned at intervals along a circumferential direction of the bicycle rim between the connecting wall, the first cavity, and the left and right side walls;
    a thickness of an inner walls of the left side wall and an inner wall of the right side wall at the plurality of connecting holes is greater than a thickness of the inner walls of the left and right side walls between two adjacent connecting holes;
    wherein a plurality of spoke reinforcing regions are formed between the inner walls of the left side wall and the right side wall at each connecting hole;
    wherein a second cavity is formed underneath the connecting wall and between the second end of the left side wall and the second end of the right side wall, wherein the second cavity is continuously distributed along an axial direction of the bicycle rim; and
    wherein the plurality of spoke reinforcing regions extend into the second cavity.

2. The single-point reinforcing structure for spoke of bicycle rim according to claim 1, wherein each of the plurality of spoke reinforcing regions has a tapered structure having a first end adjacent to the left side wall and a second end adjacent to the connecting hole, wherein the width of first end is greater than, and tapers to, the width of the second end.

3. The single-point reinforcing structure for spoke of bicycle rim according to claim 1, wherein each of the plurality of spoke reinforcing regions has a tapered structure having a first end adjacent to the connecting hole and a second end adjacent to the left side wall, wherein the width of first end is greater than, and tapers to, the width of the second end.

4. The single-point reinforcing structure for spoke of bicycle rim according to claim 1, wherein each of the plurality of spoke reinforcing regions has a first end adjacent to the left side wall and a second end adjacent to the connecting hole, wherein the width of first end is equal to the width of the second end.

5. The single-point reinforcing structure for spoke of bicycle rim according to claim 1, wherein a number of the plurality of spoke reinforcing regions equals to a number of the connecting holes, and the plurality of reinforcing regions and the connecting holes are in one-to-one correspondence; or
    the number of the plurality of the spoke reinforcing regions is less than the number of the connecting holes.

6. The single-point reinforcing structure for spoke of bicycle rim according to claim 1, wherein a wall thickness of each of the plurality of spoke reinforcing regions has a same value at every point.

7. The single-point reinforcing structure for spoke of bicycle rim according to claim 1, wherein a wall thickness of each of the plurality of spoke reinforcing regions at a peripheral portion of each of the connecting holes is greater than a thickness of other portions.

8. The single-point reinforcing structure for spoke of bicycle rim according to claim 2, wherein a wall thickness of each of the plurality of spoke reinforcing regions has a same value at every point.

9. The single-point reinforcing structure for spoke of bicycle rim according to claim 3, wherein a wall thickness of each of the plurality of spoke reinforcing regions has a same value at every point.

10. The single-point reinforcing structure for spoke of bicycle rim according to claim 4, wherein a wall thickness of each of the plurality of spoke reinforcing regions has a same value at every point.

11. The single-point reinforcing structure for spoke of bicycle rim according to claim 5, wherein a wall thickness of each of the plurality of spoke reinforcing regions has a same value at every point.

12. The single-point reinforcing structure for spoke of bicycle rim according to claim 2, wherein a wall thickness of each of the plurality of spoke reinforcing regions at a peripheral portion of each of the connecting holes is greater than a thickness of other portions.

13. The single-point reinforcing structure for spoke of bicycle rim according to claim 3, wherein a wall thickness of each of the plurality of spoke reinforcing regions at a peripheral portion of each of the connecting holes is greater than a thickness of other portions.

* * * * *